(12) United States Patent
Mrlík et al.

(10) Patent No.: US 10,119,815 B2
(45) Date of Patent: Nov. 6, 2018

(54) BINOCULAR WITH INTEGRATED LASER RANGEFINDER

(71) Applicant: MEOPTA—OPTIKA, S.R.O., Přerov (CZ)

(72) Inventors: Vojtěch Mrlík, Přerov (CZ); Zdeněk Lošťák, Olomouc (CZ)

(73) Assignee: MEOPTA—OPTIKA, S.R.O. (CZ)

( * ) Notice: Subject to any disclaimer, the term of this patent is extended or adjusted under 35 U.S.C. 154(b) by 170 days.

(21) Appl. No.: 15/194,632

(22) Filed: Jun. 28, 2016

(65) Prior Publication Data

US 2017/0074650 A1    Mar. 16, 2017

(30) Foreign Application Priority Data

Sep. 15, 2015   (CZ) .................................. 2015-627

(51) Int. Cl.
  *G01C 3/08*   (2006.01)
  *G01C 3/04*   (2006.01)
  (Continued)

(52) U.S. Cl.
  CPC .............. *G01C 3/04* (2013.01); *F41G 3/065* (2013.01); *G01C 3/08* (2013.01); *G01S 7/4812* (2013.01);
  (Continued)

(58) Field of Classification Search
  CPC . G01C 3/08; G01C 3/04; G02B 23/10; G02B 27/10
  (Continued)

(56) References Cited

U.S. PATENT DOCUMENTS 6,236,504 B1   5/2001   Kao et al.
7,999,924 B2 *  8/2011   Watanabe ................ G01C 3/04
                                                           356/3.01
(Continued)

FOREIGN PATENT DOCUMENTS

CN      203 274 737 U    11/2013
EP          1069442 A2    1/2001
(Continued)

OTHER PUBLICATIONS

Konrad et al., "Progress in Binocular Design," Optical Sensin gll, vol. 1533, Dec. 1, 1991, p. 48.
(Continued)

*Primary Examiner* — Mark Hellner
(74) *Attorney, Agent, or Firm* — Schmeiser, Olsen & Watts, LLP

(57) ABSTRACT

A binocular with an integrated rangefinder consisting of two tubes with observation channels, the optical systems of which include a Schmidt-Pechan prism reversion system with at least half-pentagonal prism and a Schmidt roof prism is provided. The laser transmitter of the transmitted infrared beam path is arranged in the first tube in parallel with the first observation channel towards the observed object and, furthermore, the display with an illuminated reticle and light beam is accommodated in the first tube, which, after passing through the integration display prism and the second separation layer on the reflective wall of the half-pentagonal prism and through the reversion system, is integrated into the first observation channel of the first tube.

6 Claims, 4 Drawing Sheets

(51) Int. Cl.
*G02B 23/10* (2006.01)
*G02B 27/10* (2006.01)
*F41G 3/06* (2006.01)
*G01S 7/481* (2006.01)
*G01S 7/51* (2006.01)
*G02B 23/04* (2006.01)
*G02B 23/18* (2006.01)

(52) U.S. Cl.
CPC ................ *G01S 7/51* (2013.01); *G02B 23/04* (2013.01); *G02B 23/10* (2013.01); *G02B 23/18* (2013.01); *G02B 27/10* (2013.01)

(58) Field of Classification Search
USPC ....................................................... 356/4.01
See application file for complete search history.

(56) References Cited

U.S. PATENT DOCUMENTS

| | | | | |
|---|---|---|---|---|
| 2003/0002149 A1* | 1/2003 | Watanabe | ................ | G01C 3/04 359/407 |
| 2010/0265490 A1* | 10/2010 | Watanabe | ................ | G01C 3/04 356/5.01 |
| 2013/0077140 A1* | 3/2013 | Bach | ........................ | G02B 5/04 359/15 |
| 2014/0176934 A1 | 6/2014 | Perger | | |
| 2014/0340669 A1* | 11/2014 | Dobschal | ................ | G01S 7/481 356/4.01 |

FOREIGN PATENT DOCUMENTS

| | | |
|---|---|---|
| EP | 1542052 A1 | 6/2005 |
| EP | 2078975 A1 | 7/2009 |
| EP | 2378245 A1 | 10/2011 |

OTHER PUBLICATIONS

European Search Report for European Application No. EP 16 02 0244, dated Dec. 13, 2016.

* cited by examiner

BINOCULAR WITH INTEGRATED LASER RANGEFINDER

CROSS-REFERENCE TO RELATED APPLICATIONS

This application claims priority to Czech Application No. 2015-627, having a filing date of Sep. 15, 2015, the entire contents of which are hereby incorporated by reference.

FIELD OF TECHNOLOGY

The following relates to a binocular with an integrated laser rangefinder, having two tubes with observation channels the optical systems of which include a Schmidt-Pechan prism reversion system with pair of prisms separated by an air gap.

BACKGROUND

In binoculars with an integrated rangefinder, the following has to be integrated in the optical systems and bodies: a transmission channel for the measurement signals from the measurement signal transmitter, a detection channel for the measurement signals to the detector, and a display channel(s) of the reticle and detection results. The rangefinder is integrated into the binocular by means of a variety of designs.

The known solutions, despite different structure and scope of patent claims, address the effective irradiation of the measured object and the detection of the reflected signal of the transmitted infrared radiation in a specific manner; some solutions also focus on the reticle and measurement data integration into the optical system of the binocular. Apart from gaining the maximum efficiency of the channels, it is the minimisation of the parallax between the channels and the maximum precision of target acquisition for all measurement distances that play a key role. Design, user friendliness and accessibility of gauging elements also apply.

For example, in patent application EP 1 542 052 A1 "Binokulares Ferglas mit integriertem Laser-Entfernugsmesser", the transmission channel is located in the axis of the hinge bridge connecting the two tubes but the transmitter housing is mechanically attached to the tube which integrates the detection channel of the measurement signals of the receiver. The display channel of the reticle and measurement results is also integrated in this tube. Both the detection and display channels are connected with the observation optical system of the same tube. In this arrangement, the parallax between the detection and display channels is avoided; however, the parallax occurs between the transmitter, which is located in the central axis of the binocular and the other two channels located in the tube of one of the observation channels.

The subject of patent application EP2 078 975 A1 "Binokulares Fernglas mit Entfernugsmesser" addresses only two modules: the transmission channel of the measurement signals of the transmitter, which is integrated into the radial path of the optical system of the first tube of the binocular, and the detection channel, which is integrated into the beam path of the optical system of the second tube of binocular. Embodiments of invention do not address the integration of the reticle display and measurement results. The principle of the transmission beam integration and the detection beam separation according to the patent is fully functional; however, dividing both the prisms with a cement layer, which may adversely affect the quality of one or the other observation channel, may be considered a disadvantage. Embodiments of the invention do not address the integration of the display beam displaying the reticle and the measured values. In this arrangement, the integration can result in a lower permeability of one of the two observation channels. The parallax between the transmission and detection channel resulting from the spacing of the observation systems of the binocular has to be taken into account.

More options are defined in patent application EP 2 378 245 A1 "Beobachtungsgerät mit Entfernugsmesser": in the main claim, the transmission channel is connected with the observation system of the first tube, and the detection channel is integrated into the observation system of the second tube. Connection of the transmission and detection channel with the same observation optical system is also described; the reticle display channel can also be integrated in the same optical system while the display channel of the measurement results is integrated into the optical observation system of the second tube of the binocular. There is an option to join the channels of the reticle and measurement results of the reticle integration and to integrate them into the optical system of the second tube of the binocular. Considering the minimisation of the parallax between the transmission channel, detection channel and reticle, the best option is to integrate all the three channels so they have a common optical axis at the output or input of the binocular. This can only be achieved by the integration into a single observation system of the binocular. One of the options of embodiments of the invention according to EP 2 378 245 A1 offers such a solution. A certain disadvantage of this solution can be the use of an infrared radiation beam splitter for the path of the transmitter optical system to reflect and the path of the detector optical system to pass, which reduces the effectiveness of the measurement signal detection. In principle, the same applies to solutions with splitters using semi-permeable layers and solutions using surface aperture division to reflective and permeable parts, which is also mentioned.

A specific design of the detection channel integration into a single observation system shown in patent application EP 1 069 442 A2 is an example where reflecting and separating the signal at reflective layers significantly weakens the brightness of the display image.

SUMMARY

An aspect relates to a novel arrangement of the three basic modules of the rangefinder system, i.e. the transmission, detection, and display channel, in conjunction with the binocular, to achieve the optimum utilisation of the display radiation, high comfort of monitoring the measurement results on the display, and a compact solution which creates space for accommodation of the rangefinder electronics without visual or spatial distortions of the appearance of the binocular. Also, an easy access to the gauging elements of the rangefinder is required. Minimisation of the parallax in targeting the measured object and long-term stability of the parallelism of the axis of the transmitting and targeting channel during the lifetime of the device is taken for granted.

The Principle of the Embodiments of the Invention

Binocular with an integrated rangefinder based on embodiments of the invention consisting of two tubes with observation channels, the optical systems of which include a Schmidt-Pechan prism reversion system with at least half-pentagonal prism and a Schmidt roof prism. The basis of the technical solution is the laser transmitter of the transmitted infrared beam path in the first tube being arranged in parallel with the first observation channel towards the observed object. The first tube features a display with an illuminated reticle and light beam, which, after passing through the integration display prism and the second separation layer on the reflective wall of the half-pentagonal prism and through the reversion system, is integrated into the first observation channel of the first tube. The transmitted beam path from the laser transmitter, once reflected from the observed object, is integrated into the detector optical system with an infrared detector as a reflected beam path after entry into the second observation channel and passing through the first separation layer of the half-pentagonal prism and after passing through the separation prism bonded to the separation surface of the half-pentagonal prism.

An important characteristic of embodiments of the invention is the integration display prism in the first observation channel and the separation prism in the second observation channel may be a 3D generalised form of a common half-pentagonal prism.

To optimise the display observation, the optical system of the laser transmitter may include the splitter of the transmitted infrared beam path and the light beam path of the ambient light, as well as the ambient light detector.

For convenient gauging, the optical systems of the laser transmitter, display and infrared detector of laser radiation may include optical elements for parallel path of the transmitted beam path from the laser transmitter, the light beam emitted from the display and the reflected beam path incident on the infrared detector.

The advantage is the optimal utilisation of the display radiation, the beam path of which passes through only one splitter on the input surface of the half-pentagonal prism, thus providing for higher efficiency. High comfort of the measurement results observation on a large two-line display. Also the compact solution which crates space for accommodation of the rangefinder electronics without visual or spatial distortion of the appearance of the binocular with the proven Schmidt-Pechan prism reversion system. The gauging elements of the rangefinder are easily accessible since the paths of the beams from the transmitter and display as well as the beams of the measurement signal detector can be directed, via mirror and prism elements of general shape, into a mutually parallel horizontal direction. These basic gauging elements of the measurement system are easily accessible even after the binocular is gauged. The parallax is minimised when targeting the measured object. The solution shows long-term parallelism stability of the transmitting and targeting channel during the lifetime of the device due to the location of the transmitter optical system/laser diode, and the display optical system in the same body.

BRIEF DESCRIPTION

Some of the embodiments will be described in detail, with reference to the following figures, wherein like designations denote like members, wherein:

FIG. 1 features the basic scheme of the construction of the binocular;

DETAILED DESCRIPTION

Figure 1:
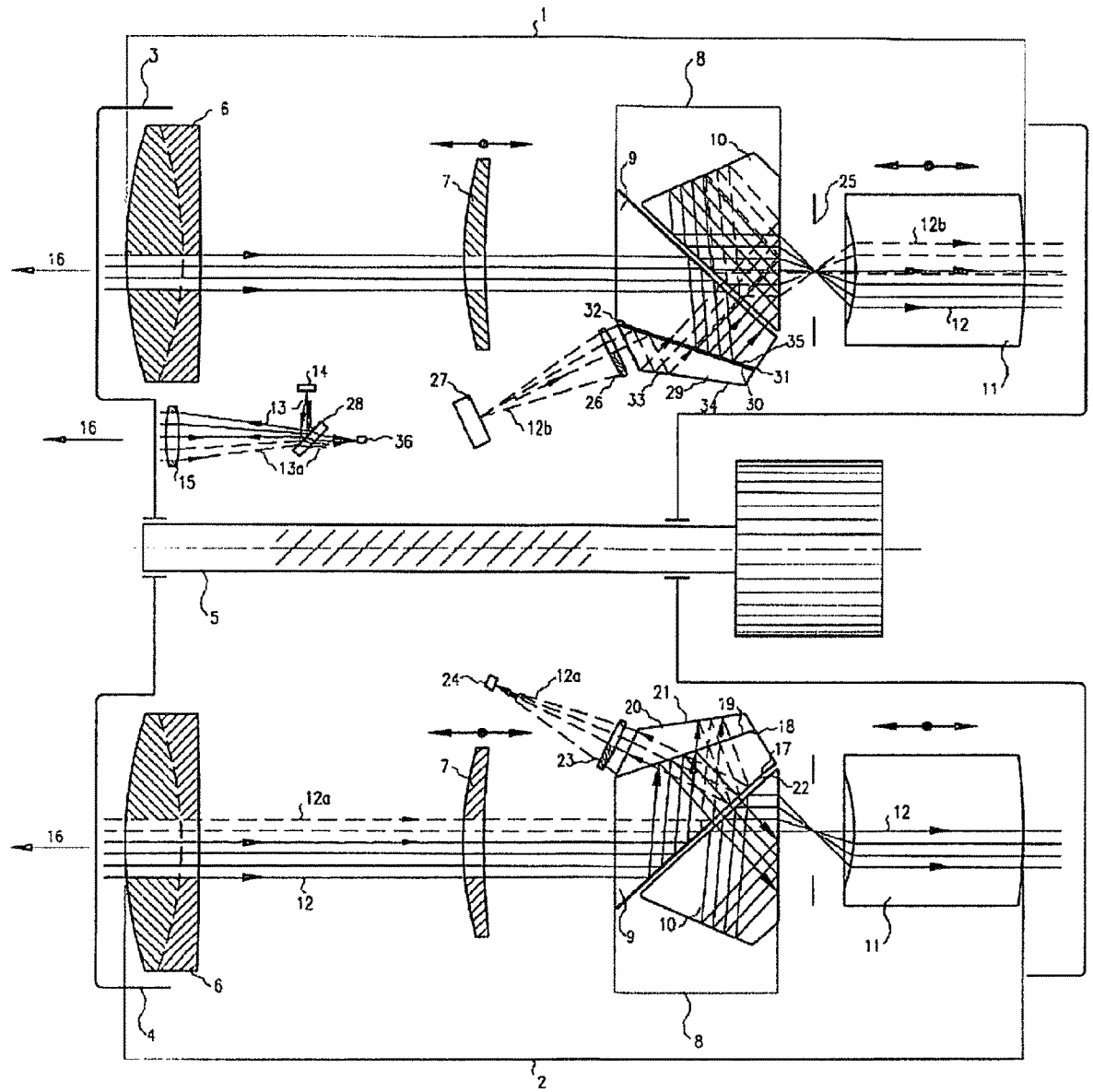
Figure 2:
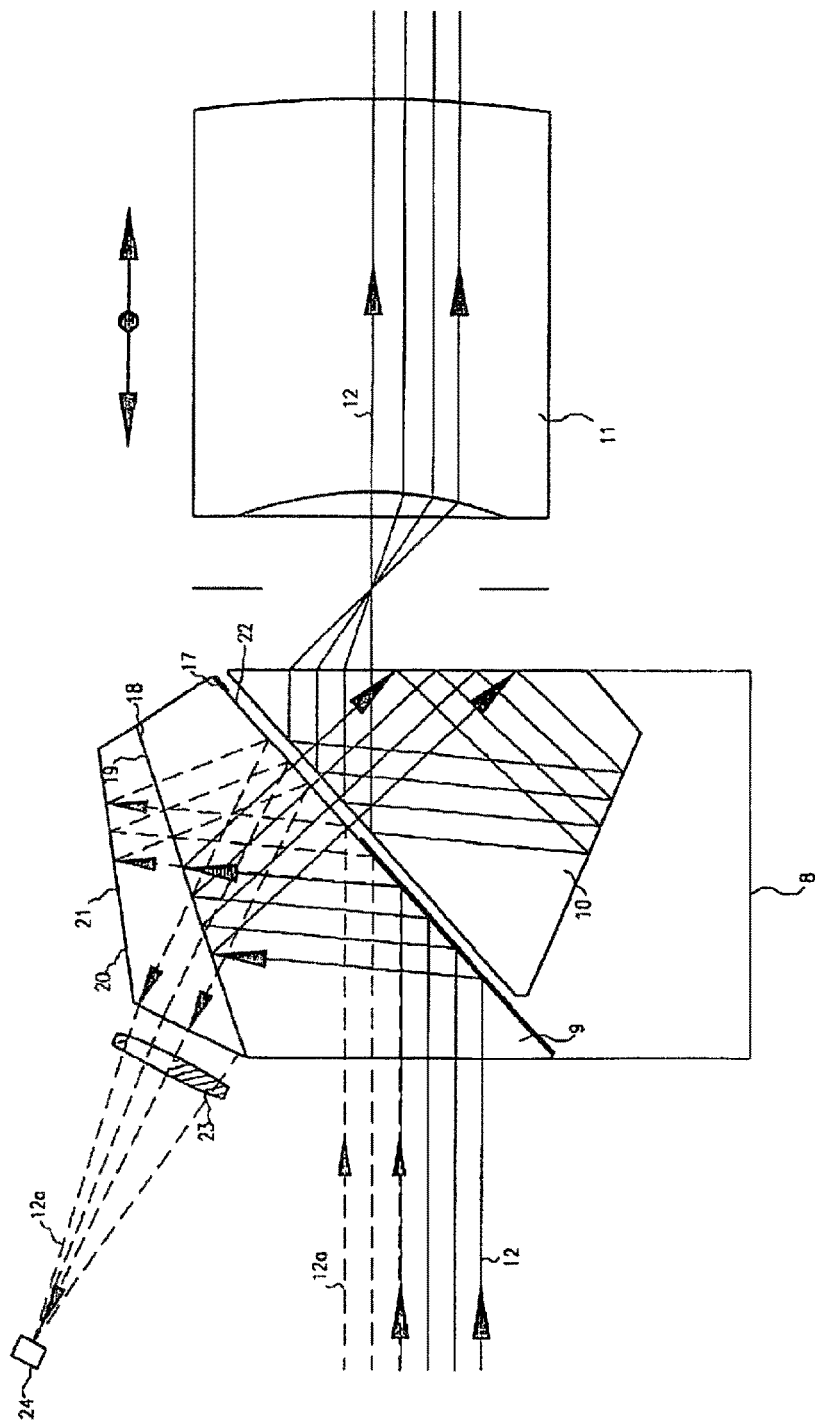
FIG. 2 is a detailed view of the first observation channel.
Figure 3:
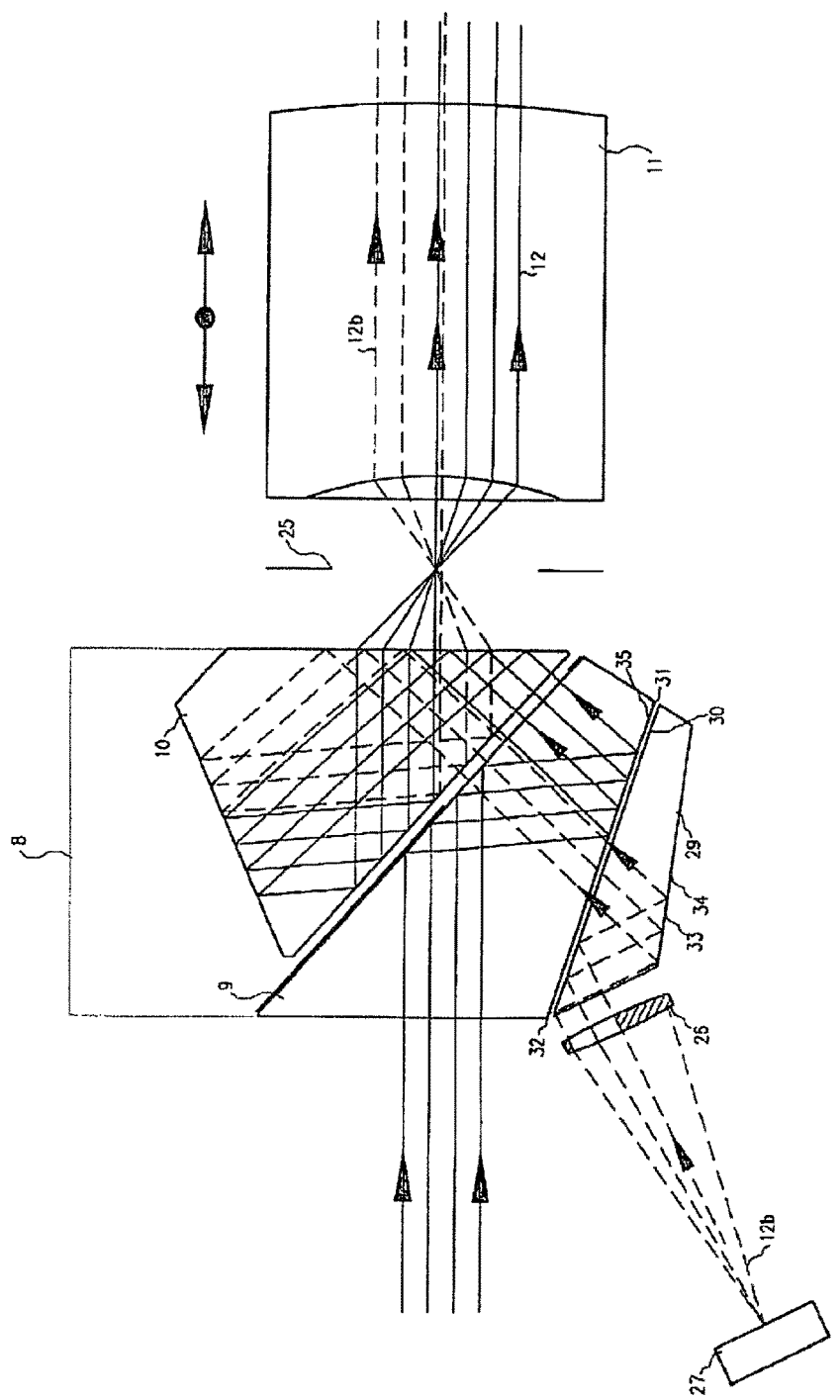
FIG. 3 is a detailed view of the second observation channel.
Figure 4:
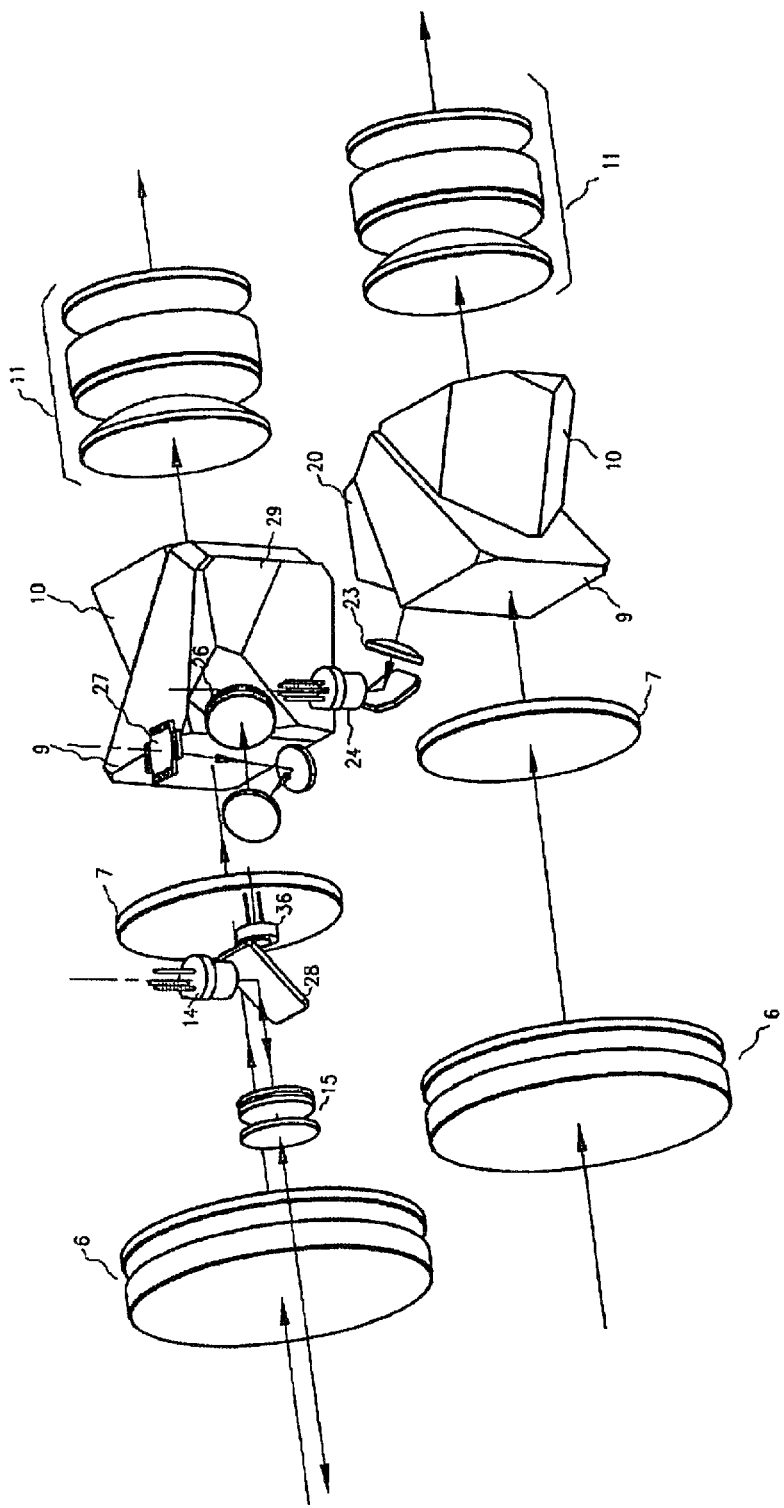
FIG. 4 shows the basic optical and optoelectronic elements in axonometric perspective.

The binocular includes of the first observation channel 1 and the second observation channel 2, which are accommodated in parallel in the first and the second tube 3, 4. The tubes 3, 4 are connected via the hinge bridge 5. The tubes 3, 4 can be rotated around the bridge axis 5, thus changing the inter-ocular distance between the first and the second observation channel 1, 2 without their relative parallelism being changed.

The first and second observation channel 1, 2 include the observation binocular system comprising the objective 6, the inner moving focusing element 7, the Schmidt-Pechan prism reversion system 8 consisting of the half-pentagonal prism and the Schmidt roof prism 10, and the eyepiece 11. The observation beam path 12 passes through the observation channels 1, 2, which is schematically illustrated with full lines with arrows indicating the direction of the beam paths.

The optical system of the laser transmitter 14 is accommodated in the first tube 3, which comprises the collimating objective 15 and the splitter of infrared and visible radiation 28. The laser transmitter 14, i.e. the transmitting infrared laser diode, is placed in the object focal plane of the optical system of the laser transmitter 14. The transmitted beam path 13 from the laser transmitter 14 is collimated via the collimating objective 15 in the direction parallel to the optical axis of the observation beam path 12 of the first and second observation channels 1, 2. The transmitted beam path 13 is schematically illustrated with full lines with arrows indicating the direction of the beams towards the observed object 16.

The reflected beam path 12a from the observed object 16 is illustrated in the second observation channel 2 with dashed lines with arrows indicating the direction of the beams.

Given the specifics of embodiments of the invention in the field of optics or beam optics, the following cannot be described separately in a static state as the structural design and subsequently in a dynamic state as a functional design. Beams passing through the optical system play a key role in understanding embodiments of the invention; therefore, the description of the function/passing of beams cannot be separated from the structural arrangement of the optical elements in the optical system. The structural arrangement is therefore described, among others, by means of beam paths.

The course of the reflected beam path 12a is as follows:

The reflected beam path 12a of the signal reflected from the measured object 16 passes through a part of the optical system of the second observation channel 2; then, following a total reflection on the prism reflective surface 17 of the half-pentagonal prism 9, it is separated on the separating surface 18 of the half-pentagonal prism 9 of the reversion system 8 from the visible part of the spectrum. The separating surface 18 features the first separating layer 19 which maximally reflects visible radiation of the beam path 12a and simultaneously permeates the infrared radiation of the reflected beam path 12a of the laser transmitter 14, reflected from the observed object 16. The first separating layer 19 maintains a fully functional optical system of the second observation channel 2 since visible radiation, i.e. the observed beam path 12, due to its spectrum of wavelengths, proceeds through the prism reversion system 8 into the eyepiece 11. The reflected beam path 12a, i.e. the infrared radiation of the measurement signal of the laser transmitter 14, permeated through the separation layer 19, proceeds to the separation prism 20 bonded to the separation surface 18 of the half-pentagonal prism 9 and, after reflection on the first reflective surface 21 adapted for reflection of infrared radiation, continues through the separation surface 18 back to the half-pentagonal prism 9. The reflected beam path 12a is reflected on the prism surface 17, which features the second separation layer 22 maximally reflecting the narrow area of radiation of the infrared laser transmitter 14 and maximally permeating visible radiation of the observation beam path 12, and exits the prism reversion system 8 through the separation prism 20. The reflected beam path 12a continues to the detector optical system 23, where it is focused on the infrared detector 24.

The display 27 is shown in the focal plane 25 of the eyepiece 11 of the first observation channel 1 by the display optical system 26, featuring the reticle defining the angular area in which the measured part of the observed object 16 is located; the results of distance measurement and other associated data are also shown. The observer can see in the eyepiece 11 the display data 27 on the background of the field of vision of the first observation channel 1.

The light beam 12b of the display 27 in the first observation channel 1 is integrated by means of the integration display prism 29 placed with a spacer gap 30 on the reflective wall 31 of the half-pentagonal prism 9, which reflects the observation beam path 12 of the first observation channel 1. The light beam 12b of the display 27, schematically illustrated with dashed lines with arrows indicating the direction of beam path of the display optical system 26 is totally reflected, after entering the integration prism 29, on the auxiliary surface 32 and, following the reflection from the opposite surface 33, featuring the reflective layer 34 for the display spectrum, it enters the half-pentagonal prism 9 where it follows the same trajectory as the observation beam path 12 of the first observation channel 1. The reflective wall 31 of the half-pentagonal prism 9 is provided with the second separation layer 35 which permeates a smaller part of radiation corresponding to the spectral display 27 radiation, while the remaining part of the visible spectrum of the first observation channel 1 is maximally reflected.

The location of the optical system of the laser transmitter 14 and the display optical system 27 in the first tube 3 ensures the minimisation of the parallax when measuring short distances and a long-term stability of the parallelism of the axis of transmitting and targeting channels throughout the lifetime of the device.

For convenient gauging of the rangefinder, the optical systems of the laser transmitter 14, display 27 and infrared detector 24 of laser radiation may include optical elements for parallel path of the transmitted beam path 13 from the laser transmitter 14, the light beam 12b emitted from the display 27 and the reflected beam path 12a incident on the infrared detector 24.

An ambient light detector 36 is connected with the optical system of the laser transmitter 14, which based on the evaluation of the brightness level of the field of vision in the vicinity of the observed object 16 adjusts the display 27 brightness level. The connection is made using a splitter 28 located in the optical system of the transmitter 14. The splitter 28, reflecting the transmitted beam path 13 of infrared radiation of the transmitter 14 at a 90° angle through the collimating objective 15 in the direction of the observed object 16 also permeates visible radiation of the light beam path 13a, i.e. ambient light coming from the external environment through the collimating objective 15 to the detector 36 of ambient light located roughly in the display focal plane of the collimating objective 15. The light beam path 13a is schematically illustrated with dashed lines with arrows indicating the direction of the beam path.

INDUSTRIAL APPLICABILITY

The binocular with an integrated laser rangefinder can be produced industrially for private, hunting or military use.

The invention claimed is:

1. A binocular with an integrated laser rangefinder comprising:
   a first tube comprising a first observation channel, a display configured to display an illuminated reticle, a first optical system including a first Schmidt-Pechan prism reversion system, a laser transmitter, and an integration display prism,
      wherein the first Schmidt-Pechan prism reversion system comprises a first at least half-pentagonal prism, and a first Schmidt roof prism,
      wherein the first at least half-pentagonal prism comprises a first separation layer,
      wherein the laser transmitter is configured to transmit a laser beam toward an observed object such that the laser beam is reflected off of a splitter and transmitted to the observed object parallel to the first observation channel and independently of the first Schmidt-Pechan prism reversion system,
      wherein the display is configured to produce a light beam, wherein the first Schmidt-Pechan prism reversion system and integration display prism are configured to direct the light beam produced by the display into the first observation channel after the light beam passes through the integration prism and passes through the first separation layer; and
   a second tube comprising a second observation channel, a separation prism, a detector optical system, an infrared detector, and a second optical system including a second Schmidt-Pechan prism reversion system,
      wherein the second Schmidt-Pechan prism reversion system comprises a second at least half-pentagonal prism, a second Schmidt roof prism,
      wherein the second at least half-pentagonal prism comprises a second separation layer,
      wherein the separation prism comprises a first reflective surface,
      wherein the separation prism is bonded to the second separation layer,
      wherein the second Schmidt-Pechan prism reversion system, the separation prism, and the detector optical system are configured such that the laser beam is configured to integrate into the detector optical system after being reflected off the observed object and entering the second observation channel and passing through the second separation layer and passing through the separation prism.

2. The binocular with an integrated laser rangefinder according to claim 1, wherein the integration display prism has a three dimensional half-pentagonal shape; wherein the separation prism has a three dimensional half-pentagonal shape.

3. The binocular with an integrated laser rangefinder according to claim 1, wherein the laser transmitter further comprises a third optical system, the third optical system comprising:
   a splitter configured to split a transmitted infrared beam path coming from the laser transmitter and a light beam path of ambient light coming from the external environment; and
   an ambient light detector.

4. The binocular with an integrated laser rangefinder according to claim 1, wherein the laser transmitter, display, and infrared detector are configured such that a transmitted beam path from the laser transmitter, the light beam emitted from the display, and a reflected beam path of the laser beam incident on the infrared detector are parallel to one another in a horizontal direction.

5. The binocular with an integrated laser rangefinder according to claim 1, wherein the laser transmitter and the display are configured to reduce a parallax when the binocular is measuring short distances.

6. The binocular with an integrated laser rangefinder according to claim 1, wherein the laser transmitter and display are configured to maintain a parallelism of an axis defining transmitting and targeting channels of the binocular.

* * * * *